United States Patent
Jeong et al.

(10) Patent No.: US 7,437,178 B2
(45) Date of Patent: Oct. 14, 2008

(54) CELL RESELECTION METHOD FOR RECEIVING PACKET DATA IN A MOBILE COMMUNICATION SYSTEM SUPPORTING MBMS

(75) Inventors: Kyeong-In Jeong, Suwon-si (KR); Kook-Heui Lee, Yongin-si (KR); Soeng-Hun Kim, Suwon-si (KR); Sung-Ho Choi, Suwon-si (KR); Gert Jan Van Lieshout, Apeldoorn (NL)

(73) Assignee: Samsung Electronics Co., Ltd. (KR)

( * ) Notice: Subject to any disclaimer, the term of this patent is extended or adjusted under 35 U.S.C. 154(b) by 656 days.

(21) Appl. No.: 10/924,078

(22) Filed: Aug. 23, 2004

(65) Prior Publication Data

US 2005/0090278 A1    Apr. 28, 2005

(30) Foreign Application Priority Data

| Aug. 22, 2003 | (KR) | .......... 10-2003-0058334 |
| Nov. 12, 2003 | (KR) | .......... 10-2003-0079761 |
| Feb. 12, 2004 | (KR) | .......... 10-2004-0009404 |

(51) Int. Cl.
*H04B 7/00* (2006.01)
*H04Q 7/20* (2006.01)

(52) U.S. Cl. .......... 455/525; 455/449; 455/436; 455/524; 370/331

(58) Field of Classification Search .......... 455/432.3, 455/464, 515, 516, 449, 434, 436, 438, 524, 455/525, 435.2, 435.3; 370/331, 347, 335, 370/342, 447, 437, 445
See application file for complete search history.

(56) References Cited

U.S. PATENT DOCUMENTS

| 6,751,472 B1 * | 6/2004 | Muhonen .......... 455/553.1 |
| 6,788,952 B1 * | 9/2004 | Jokimies et al. .......... 455/525 |
| 2001/0011019 A1 * | 8/2001 | Jokimies .......... 455/449 |
| 2001/0031638 A1 | 10/2001 | Korpela et al. |
| 2002/0032032 A1 * | 3/2002 | Haumont et al. .......... 455/436 |
| 2003/0003928 A1 * | 1/2003 | Marjelund et al. .......... 455/464 |
| 2003/0088695 A1 * | 5/2003 | Kwak et al. .......... 709/238 |
| 2005/0245260 A1 * | 11/2005 | Nielsen et al. .......... 455/435.1 |
| 2006/0068780 A1 * | 3/2006 | Dalsgaard et al. .......... 455/432.3 |
| 2006/0126590 A1 * | 6/2006 | Putcha et al. .......... 370/343 |

FOREIGN PATENT DOCUMENTS

| EP | 1 326 462 | 7/2003 |
| WO | WO 00/72609 | 11/2000 |
| WO | WO 01/05182 | 1/2001 |

* cited by examiner

*Primary Examiner*—Sujatha Sharma
(74) *Attorney, Agent, or Firm*—The Farrell Law Firm, PC

(57) ABSTRACT

A method for selecting a cell by a user equipment (UE) to receive a Multimedia Broadcast/Multicast Service (MBMS) service in a mobile communication system which supports the MBMS service with different frequency allocations (FAs) in the same area. In the method, a radio network controller (RNC) transmits information on an MBMS cell to the UE, and the MBMS cell information includes an MBMS offset for guaranteeing priority for cell reselection to the MBMS cell. The UE performs cell reselection using the MBMS cell information and receives the MBMS service from the reselected cell.

40 Claims, 9 Drawing Sheets

# CELL RESELECTION METHOD FOR RECEIVING PACKET DATA IN A MOBILE COMMUNICATION SYSTEM SUPPORTING MBMS

PRIORITY

This application claims priority under 35 U.S.C. § 119 to an application entitled "Cell Reselection Method for Receiving Packet Data in a Mobile Communication System Supporting MBMS" filed in the Korean Intellectual Property Office on Aug. 22, 2003 and assigned Serial No. 2003-58334, an application entitled "Cell Reselection Method for Receiving Packet Data in a Mobile Communication System Supporting MBMS" filed in the Korean Intellectual Property Office on Nov. 12, 2003 and assigned Serial No. 2003-79761, and an application entitled "Cell Reselection Method for Receiving Packet Data in a Mobile Communication System Supporting MBMS" filed in the Korean Intellectual Property Office on Feb. 12, 2004 and assigned Serial No. 2004-9404, the contents of all of which are incorporated herein by reference.

BACKGROUND OF THE INVENTION

1. Field of the Invention

The present invention relates generally to a packet data service, and in particular, to a method for transmitting information on a cell available for a particular packet data service to a user equipment (UE) when the cell available for the packet data service overlaps with a cell unavailable for the packet data service thereby to provide the packet data service to the UE.

2. Description of the Related Art

FIG. 1 is a diagram schematically illustrating a configuration of a general mobile communication system. Referring to FIG. 1, the mobile communication system, a Universal Mobile Telecommunications System (UMTS) mobile communication system, is comprised of a core network (CN) 100, a plurality of radio network subsystems (RNSs) 110 and 120, and a user equipment (UE) 130. Each of the RNSs 110 and 120 includes a radio network controller (RNC) 111 and 112 and a plurality of Node Bs 113-116 (i.e. base stations). For example, the RNS 110 is comprised of an RNC 111 and Node Bs 113 and 115, and the RNS 120 is comprised of an RNC 112 and Node Bs 114 and 116.

The RNCs 111 and 112 are classified into a serving RNC (SRNC), a drift RNC (DRNC) and a controlling RNC (CRNC) according to their operation. The SRNC is an RNC that manages information on each UE and controls data exchange with the CN 100. The DRNC, when data of a UE is transmitted and received to/from the SRNC via a specific RNC, is the specific RNC. The CRNC is an RNC that controls each Node B.

For example, in FIG. 1, if information on the UE 130 is managed by the RNC 111, the RNC 111 serves as an SRNC for the UE 130, and if data of the UE 130 is transmitted and received via the RNC 112 due to movement of the UE 130, the RNC 112 becomes a DRNC of the UE 130. In addition, the RNC 111 that controls the Node B 113 in communication with the UE 130 becomes a CRNC for the Node B 113.

In FIG. 1, the RNCs 111 and 112 are connected to their Node Bs 113 to 116 via Iub interfaces, and the RNC 111 is connected to the RNC 112 via an Iur interface. Although not illustrated in FIG. 1, the UE 130 is connected to a UMTS Terrestrial Radio Access Network (UTRAN) via a Uu interface.

The RNC assigns radio resource to a plurality of their Node Bs, and each of the Node Bs provides the radio resources assigned from the RNC to the UE. The radio resources are provided on a cell-by-cell basis. The radio resources provided by the Node B are radio resources for a particular cell managed by the Node B. The UE sets up a radio channel using the radio resources for the particular cell managed by the Node B, and transmits/receives data using the set radio channel. Therefore, since the UE identifies only physical channels separately formed for cells, distinguishing between the Node B and the cell is meaningless and not necessary. Herein, the terms "Node B" and "cell" are used interchangeably.

In order to support multicast/multimedia communication, there is provided Broadcast/Multicast Service in which one data source provides a particular service to a plurality of UEs. Broadcast/Multicast Service can be divided into Cell Broadcast Service (CBS) supporting a message-based service and Multimedia Broadcast/Multicast Service (MBMS) supporting real-time images and voice, still images, text data, etc.

FIG. 2 is a diagram schematically illustrating a network configuration for providing an MBMS service in a mobile communication system. Referring to FIG. 2, a Broadcast/Multicast-service center (BM-SC) 210 is a source that provides an MBMS data stream, and the BM-SC 210 schedules an MBMS data stream and delivers the scheduled MBMS data stream to a transit network (NW) 220. The transit network 220 exists between the BM-SC 210 and a serving GPRS (General Packet Radio Services) support node (SGSN) 230, and delivers the MBMS data stream provided from the BM-SC 210 to the SGSN 230. The SGSN 230 can be comprised of a gateway GPRS support node (GGSN) and an external network. The SGSN 230 receiving the MBMS data stream from the transit network 220 controls an MBMS-related service for users, or UEs, desiring to receive an MBMS service, i.e., controls an MBMS-related service such as a service for managing MBMS accounting-related data and a service for selectively transmitting MBMS data to a particular RNC 240. In addition, the SGSN 230 configures and manages an SGSN service context for an MBMS service X, and delivers the MBMS data stream to the RNC 240.

The RNC 240 controls a plurality of Node Bs, and transmits the MBMS data to a Node B where a UE requesting the MBMS service is located among its Node Bs. In addition, the RNC 240 controls a radio channel set up procedure for providing the MBMS service, and configures and manages an RNC service context for the MBMS service X using the MBMS data stream provided from the SGSN 230.

It will be assumed herein that a Node B1 (or cell 1) 260 corresponds to a cell where a UE1 261, a UE2 262 and a UE3 263 are located, and Node B2 (or cell 2) 270 corresponds to a cell where a UE4 271 and a UE5 272 are located, and one radio channel is set up between the Node B1 260 and the UEs 261 to 263 to provide the MBMS service.

Although not illustrated in FIG. 2, a home location register (HLR) is connected to the SGSN 230 and performs user authentication for the MBMS service.

A description will now be made of an operation performed between nodes supporting an MBMS service. FIG. 3 is a message flow diagram illustrating a procedure for performing an MBMS service between an RNC and a UE desiring to receive an MBMS service.

The procedure includes 4 successive processes of Announcement, Joining, Notification, and Radio Bearer (RB) Setup processes. The 4 processes will be described herein below. In the processes, an RNC provides an MBMS service to UEs requesting the MBMS service via a Node B. Although the Node B is not illustrated in FIG. 3, it is obvious to those skilled in the art that the MBMS service is provided via the Node B. Also, a description will be made of an MBMS control message transmitted for the MBMS service.

Referring to FIG. 3, through an Announcement process in step 331, an SGSN 304 announces, to a particular UE 300, fundamental information on a particular MBMS service, for example, an MBMS service identifier (ID) and information on availability of the MBMS service, i.e., start time information and duration information of the MBMS service.

If it is determined through the MBMS service Announcement process that there is a desired MBMS service, the UE 300 performs a Joining process in step 341 to send an MBMS service request to the SGSN 304.

In the Joining process of step 341, the UE 300 transmits a Joining Request message to the SGSN 304. The Joining Request message includes an identification code for a particular MBMS service the UE 300 desires to receive in an MBMS service list transmitted by the SGSN 304, and an UE ID of the UE desiring the MBMS service. The SGSN 304 then performs authentication on the UE 300 that requested the MBMS service, and informs the UE 300 whether the MBMS service is available as a result of the authentication. Further, the SGSN 304 stores therein a list of UEs desiring to receive a particular MBMS service, and position information of the UEs.

Thereafter, if a message indicating a start of the MBMS service is received from a BM-SC, the SGSN 304 transmits in step 351 a Session Start message to an RNC 302 that controls a cell where the UE 300 is located.

In step 352, the RNC 302 informs the UE 300 of availability of the MBMS service through a Notification message. The RNC 302 assigns the Notification message to a common channel such as a secondary-common control physical channel (S-CCPCH) before transmission to the UE 300. The Notification message is transmitted over an MBMS control channel (MCCH) to inform the UE 300 that the SGSN 304 will start providing the MBMS service to the UE 300 that desires the MBMS service. The Notification message is paged by a plurality of UEs, and is used for performing a group paging process. The group paging process in step 352 is distinguishable from the individual paging process.

In step 361, the UE 300 transmits a Notification Response message to the SGSN 304 in response to the Notification message. The RNC 302 determines the number of UEs desiring to receive the MBMS service for each cell through the Notification Response message, and determines a type of a radio channel to a corresponding cell. If the number of UEs desiring to receive the MBMS service is larger than or equal to a predetermined threshold, the RNC 302 provides the MBMS service to the UEs over a common channel for point-to-multipoint (PtM) transmission. However, if the number of UEs desiring to receive the MBMS service is smaller than the predetermined threshold, the RNC 302 separately provides the MBMS service to each UE over a dedicated channel for point-to-point (PtP) transmission.

In step 371, the RNC 302 transmits information on a radio bearer (RB) for transmitting the MBMS service to the UE 300 over an MBMS control channel (MCCH). Based on the MBMS RB information, a radio bearer is set up between the RNC 302 and the UE 300. The RB setup process sends information on a radio channel for providing the MBMS service to related devices, so that the UE 300 can correctly restore the transmitted MBMS service using the MBMS RB information. The MBMS RB information includes radio channel information, for example, Orthogonal Variable Spreading Factor (OVSF) code information, transport format information, radio link control (RLC) information, packet data convergence control information, etc.

If a type of the MBMS channel is determined to be a PtP type, the MBMS RB information is transmitted to the UE 300 over a dedicated control channel. However, if a type of the MBMS channel is determined as a PtM type, the MBMS RB information is transmitted to UE 300 over the MCCH. The MCCH is a channel provided with control information related to the MBMS service, and exact characteristics of the MCCH is now under discussion. According to the discussion results made to date, the MCCH has the following characteristics:

1. MCCH is separately formed for each cell.
2. MCCH is transmitted over a common physical channel such as S-CCPCH.
3. UEs can acquire information on MCCH separately formed for each cell as system information.

In step 381, the RNC 302 transmits MBMS data provided from the SGSN 304 to the UE 300 over an MBMS RB, and the UE 300 receives the MBMS data transmitted over the MBMS RB.

FIG. 4 is a diagram illustrating a structure where a plurality of Frequency Allocations (FAs) overlap each other in a particular area. Referring to FIG. 4, an RNC has one or more FAs, and provides MBMS data through the FAs. Reference numerals 401, 402, 403 and 404 illustrated in FIG. 4 represent the same geographical area, and represent cells where MBMS services are provided using different FAs. One or more UEs located in the four FAs are provided with MBMS data transmitted from the FAs. That is, the FAs represent the same area in terms of geography, but represent 4 different service cells in terms of frequency at which the MBMS data is supported. As described above, conventionally, a plurality of FAs overlap each other in the same geographical area, and each of the FAs serves the same MBMS data to one or more UEs.

Here, the MBMS data to be transmitted is the same MBMS data, and radio resources are separately assigned to the FAs for transmission of the MBMS data, resulting in a waste of limited radio resources.

If the MBMS service is unavailable at a particular FA among the FAs, UEs included in the FA where the MBMS service is unavailable cannot receive the MBMS service. For example, if FA2 402 can support the MBMS service but FA1 401, FA3 403 and FA4 404 cannot support the MBMS service, then UEs included in FA1 401, FA3 403 and FA4 404 cannot receive the MBMS service.

Therefore, a method for providing the MBMS service to UEs included in an FA that cannot support the MBMS service is required.

SUMMARY OF THE INVENTION

It is, therefore, an object of the present invention to provide a method for allowing a UE located in a cell unavailable for a packet data service to receive the packet data service in a mobile communication system.

It is another object of the present invention to provide a method for transmitting information on a cell available for a packet data service among cells located in the same area but having different frequencies, to a UE located in a particular cell as system information.

It is further another object of the present invention to provide a method for transmitting information on a cell available for a packet data service among cells located in the same area but having different frequencies, to a UE located in a particular cell over a control channel.

It is yet another object of the present invention to provide a method for transmitting information on a neighbor Node B to a UE located in a particular cell among cells located in the same area but having different frequencies.

It is still another object of the present invention to provide a method for performing cell reselection at a preferred frequency band for an MBMS service to a UE located in a particular cell among cells located in the same area but having different frequencies.

It is still another object of the present invention to provide a method for performing efficient inter-frequency measurement and inter-frequency cell reselection for a UE receiving an MBMS service in a mobile communication system.

In accordance with a first aspect of the present invention, there is provided a method for selecting a cell by a user equipment (UE) to receive a Multimedia Broadcast/Multicast Service (MBMS) service in a mobile communication system which supports the MBMS service with different frequency allocations (FAs) in the same area, the method including transmitting, by a radio network controller (RNC), information on an MBMS cell to the UE, the MBMS cell information including an MBMS offset for guaranteeing priority for cell reselection to the MBMS cell; and performing, by the UE, cell reselection using the MBMS cell information and receiving the MBMS service from the reselected cell.

In accordance with a second aspect of the present invention, there is provided a method for reselecting a cell for a Multimedia Broadcast/Multicast Service (MBMS) service in a mobile communication system which supports the MBMS service with different frequency allocations (FAs) in the same area, the method including transmitting, by a radio network controller (RNC), a system information block (SIB) to a user equipment (UE), the SIB including identification information indicating whether a neighbor cell is available for the MBMS service; and performing, by the UE, cell reselection to an MBMS cell using the SIB.

In accordance with a third aspect of the present invention, there is provided a method for reselecting a cell for a Multimedia Broadcast/Multicast Service (MBMS) service in a mobile communication system which supports the MBMS service with different frequency allocations (FAs) in the same area, the method including periodically transmitting, by a radio network controller (RNC), identification information indicating whether a neighbor cell is available for an MBMS service, to a user equipment (UE) through a control message; and performing, by the UE, cell reselection to an MBMS cell using the identification information received through the control message.

In accordance with a fourth aspect of the present invention, there is provided a method for performing cell reselection to a preferred frequency band by a user equipment (UE) in a mobile communication system which supports a Multimedia Broadcast/Multicast Service (MBMS) service with different frequency allocations (FAs) in the same area, the method including receiving, from a radio network controller, a message including an MBMS service identifier (ID), information on a preferred frequency for the MBMS service, and an MBMS offset for guaranteeing cell reselection; and performing inter-frequency measurement using the information included in the message, and performing cell reselection if a preferred frequency band for an MBMS cell is higher in reception power than a frequency band for a current cell.

In accordance with a fifth aspect of the present invention, there is provided a method for providing by a radio network controller (RNC) a Multimedia Broadcast/Multicast Service (MBMS) service to a user equipment (UE) located in a non-MBMS frequency allocation (FA) in a mobile communication system which supports the MBMS service with different FAs in the same geographical area, the method including transmitting, by the RNC, a system information block (SIB) including information on an MBMS FA to the UE; and periodically transmitting a message including information on the MBMS FA to the UE.

In accordance with a sixth aspect of the present invention, there is provided a method for receiving a Multimedia Broadcast/Multicast Service (MBMS) service by a user equipment (UE) located in a non-MBMS frequency allocation (FA) in a mobile communication system which supports the MBMS service with different FAs in the same geographical, the method including receiving, from a radio network controller (RNC), a system information block (SIB) including information on an MBMS FA; analyzing the information on the MBMS FA in the SIB, and performing cell reselection to the MBMS FA based on the analysis result.

In accordance with a seventh aspect of the present invention, there is provided a method for receiving a Multimedia Broadcast/Multicast Service (MBMS) service by a user equipment (UE) located in a non-MBMS frequency allocation (FA) in a mobile communication system which includes at least one non-MBMS cell and supports the MBMS service with different FAs in the same area, the method including receiving, by the UE, information on an MBMS cell from a radio network controller (RNC); requesting, by the UE, a particular MBMS service; analyzing the received information; and reselecting a cell available for the particular MBMS service based on the analyzed information.

In accordance with an eighth aspect of the present invention, there is provided a method for providing a Multimedia Broadcast/Multicast Service (MBMS) service to a user equipment (UE) located in a cell unavailable for the MBMS service by a radio network controller (RNC) including at least one cell unavailable for the MBMS service and other cells providing the MBMS service with different frequencies in the same area in a mobile communication system, the method including transmitting, by the RNC, a system information block (SIB) for the MBMS service to the UE; reselecting, by the UE, a cell available for a particular MBMS service upon receiving a request for the particular MBMS service; and assigning radio resources for providing the particular MBMS service to the UE.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail with reference to the annexed drawings. In the following description, a detailed description of known functions and configurations incorporated herein has been omitted for conciseness.

The present invention proposes a method for providing an MBMS service to a plurality of UEs located in different FAs covering the same geographical area. In addition, the present invention proposes a method for allowing UEs located in an FA unavailable for an MBMS service to receive the MBMS service.

Figure 1:
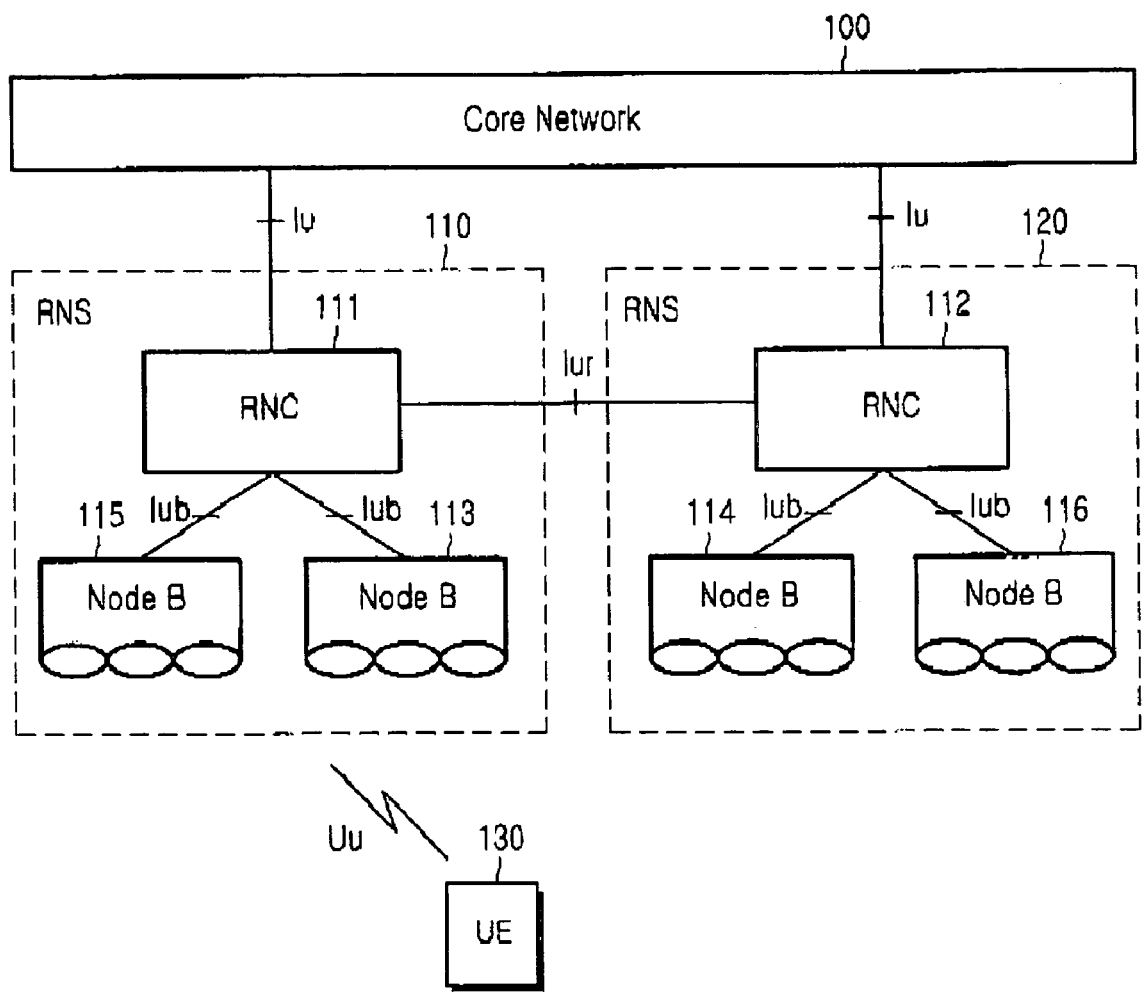
FIG. 1 is a diagram schematically illustrating a configuration of a general mobile communication system.
Figure 2:
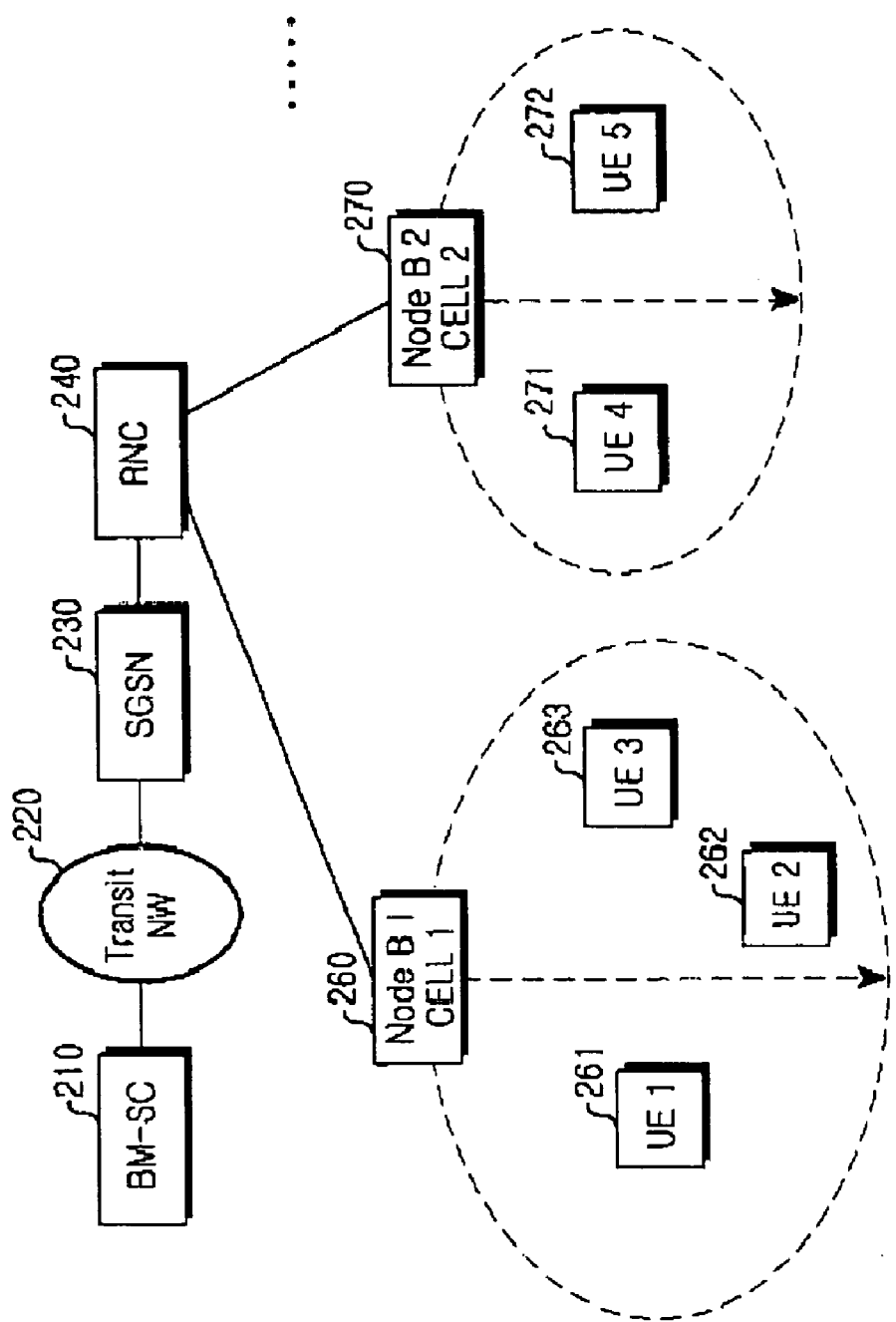
FIG. 2 is a diagram schematically illustrating a configuration of an MBMS system.
Figure 3:
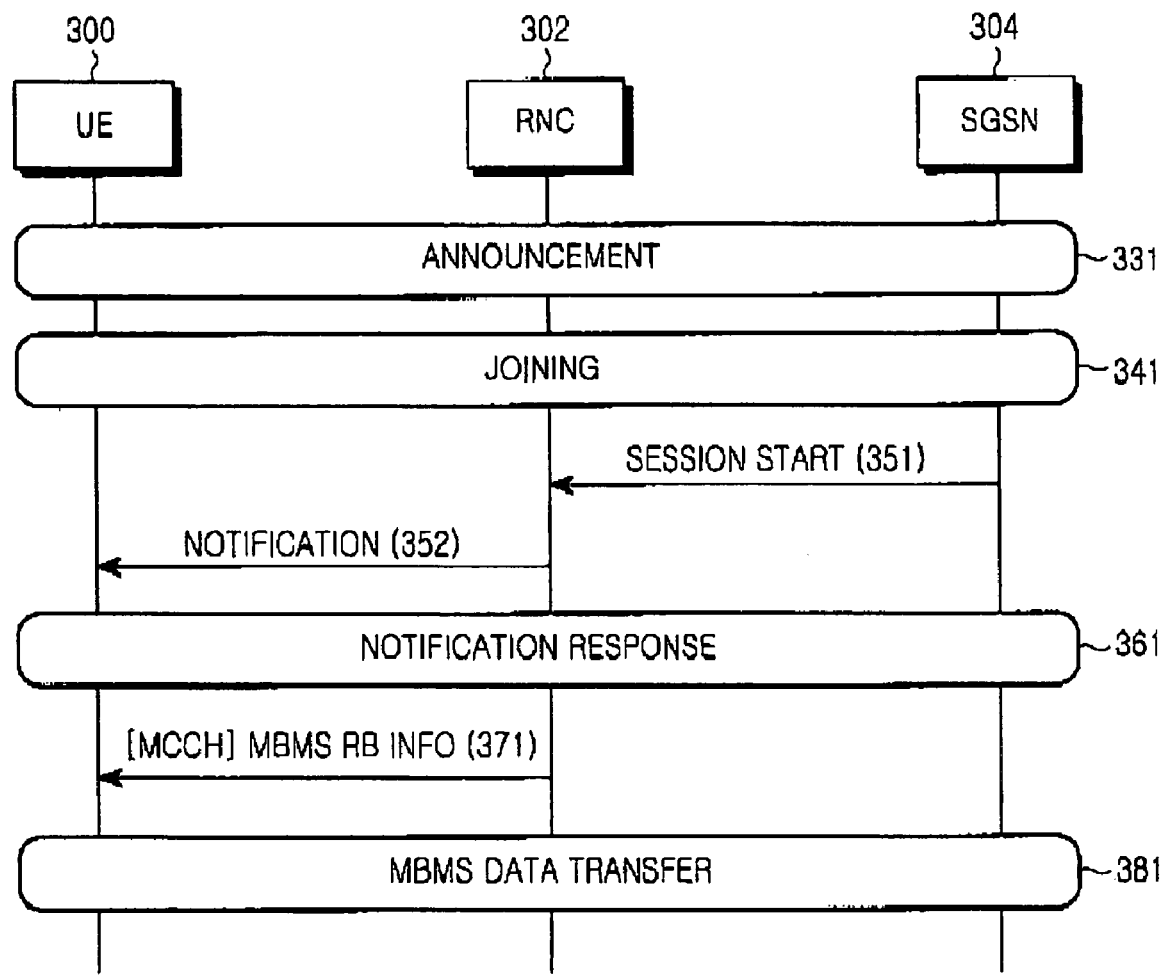
FIG. 3 is a message flow diagram illustrating an operation between nodes in a mobile communication system supporting an MBMS service.
Figure 4:
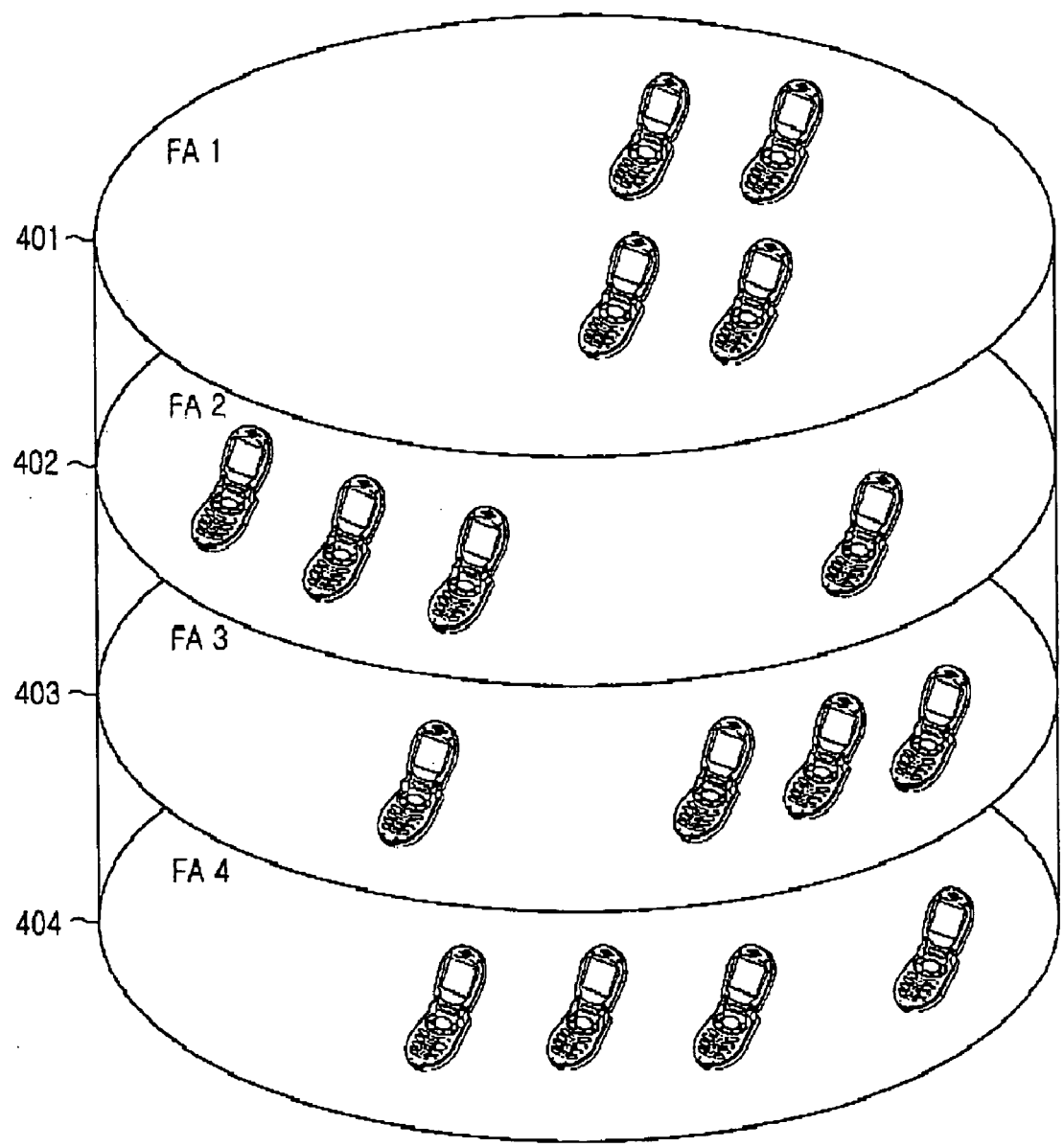
FIG. 4 is a diagram illustrating a configuration where a plurality of cells overlap each other in a particular area.
Figure 5:
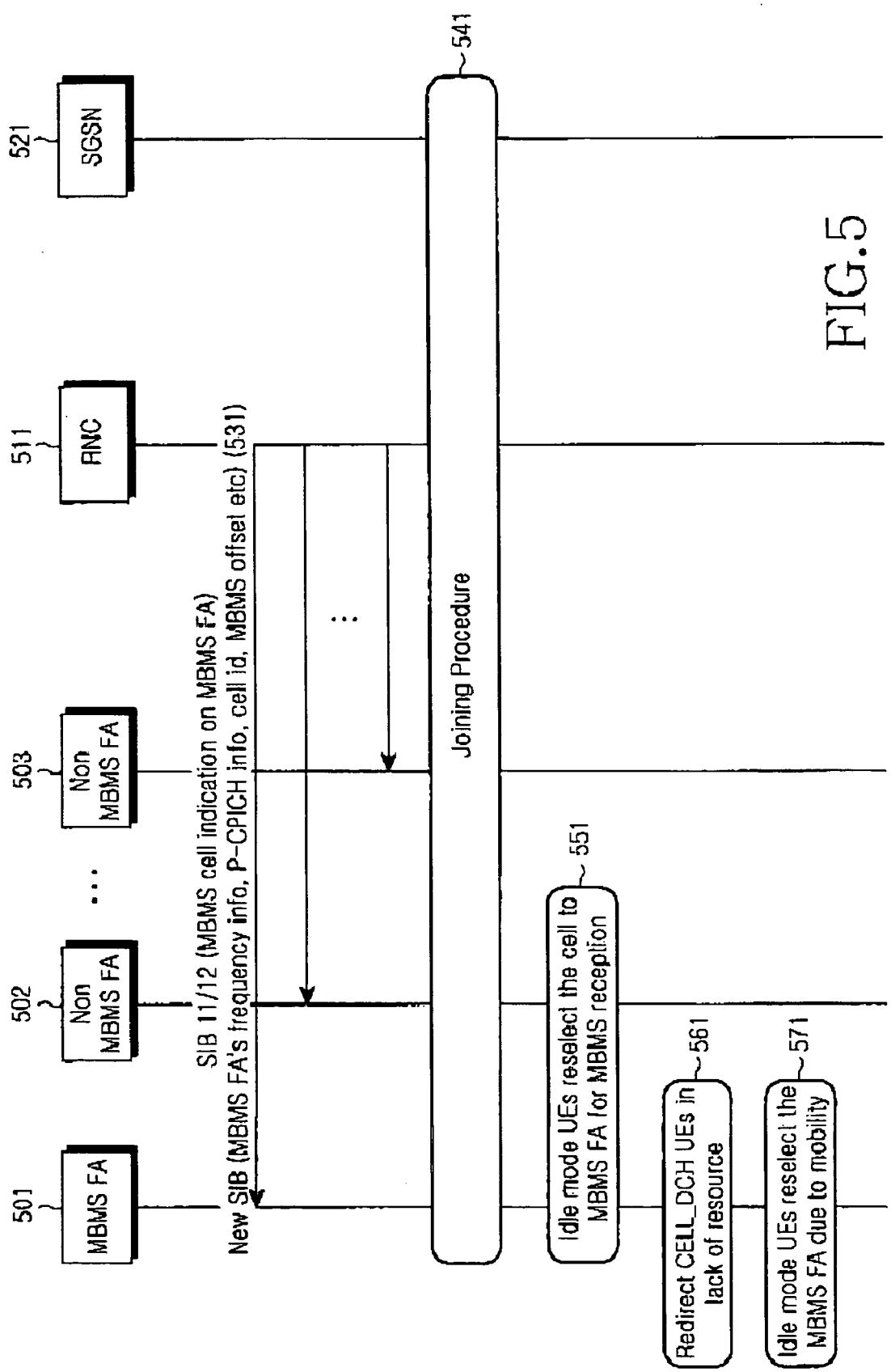
FIG. 5 is a message flow diagram illustrating a procedure for reselecting an MBMS cell according to a first embodiment of the present invention.

With reference to FIG. 5, a description will now be made of a method for allowing UEs located in FAs unavailable for an MBMS service to receive the MBMS service when there is one FA available for the MBMS service among FAs overlapping each other in the same area.

FIG. 5 is a message flow diagram illustrating a procedure for providing information on an FA available for an MBMS service to UEs according to an embodiment of the present invention. Referring to FIG. 5, reference numeral 501 represents an FA providing (or available for) an MBMS service (hereafter referred to as an "MBMS FA" for simplicity), and reference numerals 502 and 503 represent FAs not providing (or unavailable for) the MBMS service (hereafter referred to as "non-MBMS FAs" for simplicity). Reference numerals 501, 502 and 503 represent FAs which overlap each other in the same geographical area and use different frequencies. Each of the FAs can be comprised of one or more cells. It will be assumed herein that each FA has one cell, for the convenience of explanation. In the following description, the terms "FA" and "cell" are used interchangeably. Reference numeral 511 represents an RNC for providing the MBMS service, and reference numeral 521 represents an SGSN. In the following description, it will be assumed that a UE is in an idle mode.

In step 531, the RNC 511 transmits a system information block (SIB) including information on the MBMS FA 501 to respective FAs. Here, the RNC 511 transmits different system information to the FAs 501, 502 and 503. Therefore, UEs located in the FAs 501, 502 and 503 can have different SIBs. The RNC 511 newly adds information on the MBMS FA 501 to the SIB, and transmits the new SIB to all the cells (of FAs) 501, 502 and 503.

In this regard, the present invention proposes the following 3 methods for defining an SIB for transmitting information on the FA.

A first method partially adds information on the MBMS FA while using an SIB currently used in the 3GPP (Third Generation Partnership Project) standard.

A second method uses a dedicated SIB for supporting the MBMS service.

A third method adds offset information for the MBMS FA. The third method can be applied to the SIB used in the current 3GPP standard according to the first method, or can be applied to the MBMS-dedicated SIB according to the second method. In an embodiment of the present invention, the third method adds the offset information to the first method.

First Method

Table 1 illustrates an SIB obtained by adding information on an MBMS FA to the SIB currently used in the 3GPP standard according to an embodiment of the present invention. For convenience, the SIB will be referred to as "SIB 11/12." SIB 11/12 represents information including information SIB 11 for a UE in an idle mode and information SIB 12 for a UE in a connected mode.

TABLE 1

| Information Element/Group name | Need | Multi | Type and reference | Semantics Description | Version |
|---|---|---|---|---|---|
| MBMS enabled cell indication | | | Integer (0, 1, 2) | 0 indicates not MBMS enabled cell, 1 indicates MBMS enabled cell belonging to the different Node B, 2 indicates MBMS enabled cell belonging to the same Node B. | |
| Cell individual offset | MD | | Real(−10 . . . 10 by step of 0.5) | In dB. Default value is 0 dB Used to offset measured quantity value. | |
| Reference time difference to cell | OP | | Reference time difference to cell | In chips. This IE is absent for serving cell. | |
| Read SFN indicator | MP | | Boolean | TRUE indicates that read of SFN is requested for the target cell. | |
| CHOICE mode >FDD | MP | | | | |
| >>Primary CPICH info | OP | | Primary CPICH info | This IE is absent only if measuring RSSI only (broadband measurement.) | |
| >>Primary CPICH Tx power | OP | | Primary CPICH Tx power | Required if calculating pathloss. | |
| >>TX Diversity Indicator | MP | | Boolean | TRUE indicates that transmit diversity is used. | |

The SIB 11/12 includes measurement control information used in a cell, and includes intra-frequency measurement control information, inter-frequency measurement control information, inter-RAT (Radio Access Technology) measurement control information.

The measurement control information, a list of neighbor cells which are measurement objects in the cell, includes intra-frequency cell info list, inter-frequency cell info list, inter-RAT cell info list.

The list of neighbor cells includes information on the MBMS FA. That is, the list of neighbor cells includes MBMS FA's frequency information, cell identification, cell information, etc.

The FA's frequency information is comprised of an uplink UTRAN Absolute Radio Frequency Channel Number (UARFCN), and a downlink UARFCN.

The cell identification (cell ID) is identification information uniquely assigned to each cell. That is, the cell ID is a unique value assigned to each cell to identify a plurality of cells existing in one FA. In the present invention, because it is assumed that each FA has one cell, the cell ID can also be used as an ID for identifying the FA.

The cell information represents a primary scrambling code for a primary common pilot channel (P-CPICH) of a cell corresponding to the MBMS FA.

Therefore, the RNC 511 adds information on a cell available for the MBMS service (hereinafter referred to as an "MBMS cell"), i.e., 'MBMS enabled cell indication' information of Table 1, to the SIB 11/12, and tranmsits the information-added SIB 11/12 to the UEs.

The 'MBMS enabled cell indication' information is given a value of an integer. If the MBMS enabled cell indication is set to '0', it means that the target cell, or the FA 501, is a cell unavailable for the MBMS service (a "non-MBMS cell"). However, if the MBMS enabled cell indication is set to '1', it means that the target cell, or the FA 501, is an MBMS cell, which belongs to a Node B being different from the Node B where the UE is currently located. In addition, if the MBMS enabled cell indication is set to '2', it means that the target cell, or the FA 501, is an MBMS cell, which belongs to a Node B being identical to the Node B corresponding to the cell (FA 502 or FA 503) where the UE is currently located.

The MBMS enabled cell indication can be optimized into a 2-bit length instead of the 3-bit length illustrated in Table 1. In this case, the MBMS enabled cell indication is represented with one integer in determining whether the cell where the UE is located and the target cell for cell reselection both belong to the same Node B.

In other words, rather than representing the MBMS enabled cell indication with an integer 1 and an integer 2 in determining whether the MBMS cell belongs to the same Node B, the MBMS enabled cell indication is set to an integer 1 for an MBMS cell and an integer 0 for a non-MBMS cell. Decision on to which cell the UE will perform cell reselection among cells available for the MBMS service is made based on frequency measurement result regardless of the Node B. That is, the UE selects a cell for which the MBMS enabled cell indication is set to '1' among the cells located in the highest rank as a result of the frequency measurement.

Referring back to FIG. 5, in step 531, a UE located in FA 502 or FA 503 analyzes the SIB 11/12 including the MBMS enabled cell indication field separately transmitted to each corresponding cell, and determines whether a neighbor cell is available for the MBMS service. That is, the corresponding UE located in FA 502 or FA 503 determines whether the neighboring FA 501 is available for the MBMS service and whether the cell of FA 501 belongs to a Node B identical to the Node B corresponding to its current cell, based on the MBMS enabled cell indication field in the SIB 11/12.

However, a UE located in the cell for FA 501 cannot determine whether its cell is an MBMS cell based on the SIB 11/12 transmitted from the cell 501. This is because the SIB 11/12 includes FA information for a neighbor cell.

Therefore, the UE located in the FA 501 analyzes information on MCCH through another SIB transmitted to its cell, and determines whether the FA 501 is an MBMS cell. Alternatively, the UE determines whether its cell 501 is an MBMS cell by applying the 'MBMS enabled cell indication' information used in the SIB 11/12 to an SIB 3/4 supporting the MBMS service in the cell.

The SIB 3/4 includes information on cell selection and cell reselection for a UE in an idle mode and a UE in a connected mode. The SIB 3/4 includes the MBMS enabled cell indication field to indicate whether the current cell is an MBMS cell. Also, the MBMS enabled cell indication field can be included in other SIBs.

Therefore, the UE located in the cell for the FA 501 compares the 'MBMS enabled cell indication' information used in the SIB 11/12 with the 'MBMS enabled cell indication' information used in the SIB 3/4, and determines whether the FA 501 is an MBMS cell if there is the MBMS enabled cell indication of the SIB 3/4.

Second Method

Table 2 illustrates a dedicated SIB for supporting an MBMS service according to an embodiment of the present invention.

TABLE 2

| Information Element/Group name | Need | Multi | Type and reference | Semantics Description | Version |
|---|---|---|---|---|---|
| MBMS enabled cell info | | | 1 to maxMBMS CellMeas | | |
| >same service area indication | | | | True indicates the cell belongs to the same Node B | |
| >cell id | | | | | |
| >frequency info | | | | | |
| >cell info | | | | | |
| >>FDD | | | | | |
| >>>Primary CPICH info | | | | Primary CPICH info | |
| . | | | | | |
| . | | | | | |
| . | | | | | |

As illustrated in Table 2, the RNC 511 sets a MBMS-dedicated SIB (or MBMS-only SIB) including information on an MBMS cell and separately transmits the MBMS-dedicated SIB to a corresponding cell.

An MBMS enabled cell info field in the MBMS-dedicated SIB indicates whether a current UE's cell is an MBMS cell. If the current UE's cell corresponds to an MBMS FA, the MBMS enabled cell info field indicates whether the current UE's cell is an MBMS cell, and the MBMS enabled cell info field includes information on the UE's cell.

A same service area indication field in the MBMS-dedicated SIB indicates whether the MBMS cell is a cell having the same service area as the current UE's cell, i.e., whether the MBMS cell is a cell included in the same Node B as the UE's Node B.

A cell ID field in the MBMS-dedicated SIB indicates an ID of an MBMS cell.

A frequency info field in the MBMS-dedicated SIB indicates an uplink UTRAN Absolute Radio Frequency Channel Number (UARFCN), and a downlink UARFCN.

A cell info field in the MBMS-dedicated SIB indicates a primary scrambling code for a primary common pilot channel (P-CPICH) of a cell corresponding to the MBMS FA.

Therefore, a UE of a particular FA, or cell, receiving the MBMS-dedicated SIB, sends an MBMS service request to a cell for which the same service area indication field has a True value, and then preferentially performs cell reselection on the cell. After analyzing the MBMS-dedicated SIB illustrated in Table 2 in step 531, each of UEs located in the FA 501, FA 502 and FA 503 determines whether its current cell is available for the MBMS service.

Third Method

Table 3 proposes a method for allowing a UE to perform cell reselection using MBMS_Qoffset_s,n information. For convenience, the third method applies the MBMSQoffset_s,n information to the SIB used in the first method. Alternatively, the third method can apply the MBMS_Qoffset_s,n information to the SIB used the second method. An SIB according to the third method represents an SIB 11/12 including an MBMS_Qoffset_s,n field instead of the MBMS enabled cell indication field, as illustrated in Table 3.

vice and its UE ID to the SGSN 521. The SGSN 521 performs authentication on the UEs in the FA 501, FA 502 and FA 503.

According to the first method, in step 551, UEs in the non-MBMS FAs 502 and 503 preferentially perform cell reselection to a cell for which the MBMS enabled cell indication field in the SIB 11/12 is set to 2. If there is no MBMS enabled cell indication field having a value 2, the UEs perform cell reselection to an MBMS cell for which the MBMS enabled cell indication field has a value 1. In this case, the MBMS enabled cell indication field has a 3-bit length.

However, in the case where the MBMS enabled cell indication field has a 2-bit length, the UEs perform cell reselection to a cell located in the highest rank among the MBMS cells as a result of the frequency measurement. The UEs in the non-MBMS FAs 502 and 503 cover the same service area, and first perform intra-frequency measurement rather than inter-frequency measurement in order to preferentially reselect the cell corresponding to the MBMS FA 501 rather than a particular neighbor FA (or cell) covering another service area.

According to the second method, in step 551, the UEs in the non-MBMS FAs 502 and 503 analyze information on an MBMS cell through an MBMS enabled cell info field in the MBMS-dedicated SIB. Further, the UEs analyze the same service area indication field to determine whether the MBMS cell is a cell belonging to the same Node B as the Node B where they are located, and perform cell selection to the cell belonging to the same Node B. In order to perform cell

TABLE 3

| Information Element/Group name | Need | Multi | Type and reference | Semantics Description | Version |
|---|---|---|---|---|---|
| MBMS_Qoffset_s,n | OP | | Integer | In dB. This IE is presented only in MBMS enabled cell for offset value compared with serving cell. | |
| Cell individual offset | MD | | Real(−10 . . . 10 by step of 0.5) | In dB. Default value is 0 dB Used to offset measured quantity value. | |
| Reference time difference to cell | OP | | Reference time difference to cell | In chips. This IE is absent for serving cell. | |
| Read SFN indicator | MP | | Boolean | TRUE indicates that read of SFN is requested for the target cell. | |
| CHOICE mode | MP | | | | |
| >FDD | | | | | |
| >>Primary CPICH info | OP | | Primary CPICH info | This IE is absent only if measuring RSSI only (broadband measurement.) | |
| >>Primary CPICH Tx power | OP | | Primary CPICH Tx power | Required if calculating pathloss. | |
| >>TX Diversity Indicator | MP | | Boolean | TRUE indicates that transmit diversity is used. | |

. . .

The MBMS_Qoffset_s,n value is an optional value included in the SIB 11/12 only when a neighbor cell which is an object of the frequency measurement supports the MBMS service. The MBMS_Qoffset_s,n value is applied when UEs in an idle mode or in CELL_FACH, CELL_PCH and URA_PCH states perform cell selection and cell reselection.

Referring back to FIG. 5, in step 541, the UEs in the FA 501, FA 502 and FA 503 perform a Joining procedure (or service request procedure). In the Joining procedure of step 541, each of the UEs in the FA 501, FA 502 and FA 503 transmits an identification code for the desired MBMS serreselection to the cell corresponding to the MBMS FA, the UEs must satisfy a reception power measurement result.

According to the third method, in step 551, the UEs in the non-MBMS FAs 502 and 503 perform cell reselection using Equation (3) hereinbelow when they have an MBMS service context after joining the MBMS service in step 541.

Equation (1) and Equation (2) below are equations applied for cell reselection by a UE, currently defined in the 3GPP standard.

When a UE reselects a cell, if neighbor cells satisfy S criteria for cell selection as a result of frequency measurement, cells are sequentially ranked by R criteria. In the current 3GPP standard, equations for the R criteria are defined as follows. Because parameters used in the following equations are defined in 3GPP TS25.304, a detailed description thereof will be omitted herein.

$$Rs = Qmeas,s + Qhysts \quad (1)$$

$$Rn = Qmeas,n - Qoffset,n - Ton*(1-Ln) \quad (2)$$

Here, Rs denotes an R criterion of a current serving cell, and Rn denotes a neighbor cell included in an SIB 11/12. The Rn, as described above, is applied only for the cells satisfying the S criterion.

In order to reselect an MBMS cell, if the MBMS_Qoffset_s,n value of Table 3 is applied to the R criteria of Equation (2), it becomes Equation (3):

$$Rn = Qmeas,n - Qoffset,n - Ton*(1-Ln) + MBMS\_Qoffset\_s,n \quad (3)$$

In other words, if a UE has an MBMS service context after joining an MBMS service in step 541 in order to receive the MBMS service, the UE reselects a cell using Equation (3). That is, the FA 501 transmitting an SIB 11/12 including the MBMS_Qoffset_S,n value has a larger Rn value than the FAs 502 and 503 not having the MBMS_Qoffset_s,n value in the SIB 11/12.

Therefore, in step 551, the UEs in the non-MBMS FAs 502 and 503 reselect the cell having an SIB 11/12 including the MBMS_Qoffset_s,n value. In this way, a UE increases selection probability of an MBMS cell using the MBMS_Qoffset_s,n value when performing cell reselection according to resource of cell, thereby securing continuity of the MBMS service during movement of the UE.

That is, by reflecting an MBMS offset value for an MBMS cell in the R criteria equation for cell reselection, the MBMS cell is located in a higher rank than the non-MBMS cell.

Therefore, a UE that requested the MBMS service increases reselection probability of a cell corresponding to the MBMS FA by the modified R criteria equation. The same MBMS_Qoffset_s,n value is applied to all cells available for the MBMS service, or different MBMS_Qoffset_s,n values are separately applied to neighbor cells of the current serving cell.

Further, in step 551, a time when UEs that requested an MBMS service perform cell reselection to a cell for the MBMS FA can be differently set for a UE in an idle mode and a UE in a connected mode. That is, because the UE in an idle mode currently transmits no MBMS data, i.e., performs no specific operation, it moves to the MBMS FA 501 immediately after sending an MBMS service request. However, the UE in a connected mode moves to the MBMS FA 501 when an actual session for MBMS data is started, rather than after sending the MBMS service request.

For simplicity of an UE's operation, UEs in other connected states except a CELL_DCH state can be identical in operation to the UE in an idle mode. Although a time when UEs perform cell reselection to an MBMS cell is differently set for a UE in an idle mode and a UE in a connected mode in the following description, if a time when UEs in other connected states except the CELL_DCH state perform cell reselection to an MBMS cell is applied as in the idle mode, the UEs are identical in operation to the UE in an idle mode, for simplicity of an UE's operation.

In step 561, a UE in an idle mode that performed cell reselection to the MBMS FA 501 sends a dedicated-radio resource request in response to a user's voice call request, and the UE intends to make a transition to the CELL_DCH state. In this case, due to lack of available dedicated radio resources except the resources previously reserved to provide the MBMS service, the UE intends to perform cell reselection to another cell.

Therefore, the cell reselection in step 561 is performed using a redirection info field in a Radio Resource Controller (RRC) Connection Reject message transmitted from an RNC to a UE in a process of setting up an RRC connection. That is, in step 561, the UE that completed an operation in the CELL_DCH state after moving to another cell other than the MBMS FA 501, performs cell selection to a cell corresponding to the MBMS FA 501 using the redirection info field to receive the MBMS service again.

In step 571, a UE that moved to another cell after being located in the MBMS FA 501 performs cell re-selection to an MBMS cell. The UE analyzes "MBMS enabled cell indication" or "MBMS enabled cell info" information on a neighbor MBMS cell through the SIB illustrated in Table 1 or Table 2, and performs cell reselection to the corresponding MBMS cell.

Figure 6:
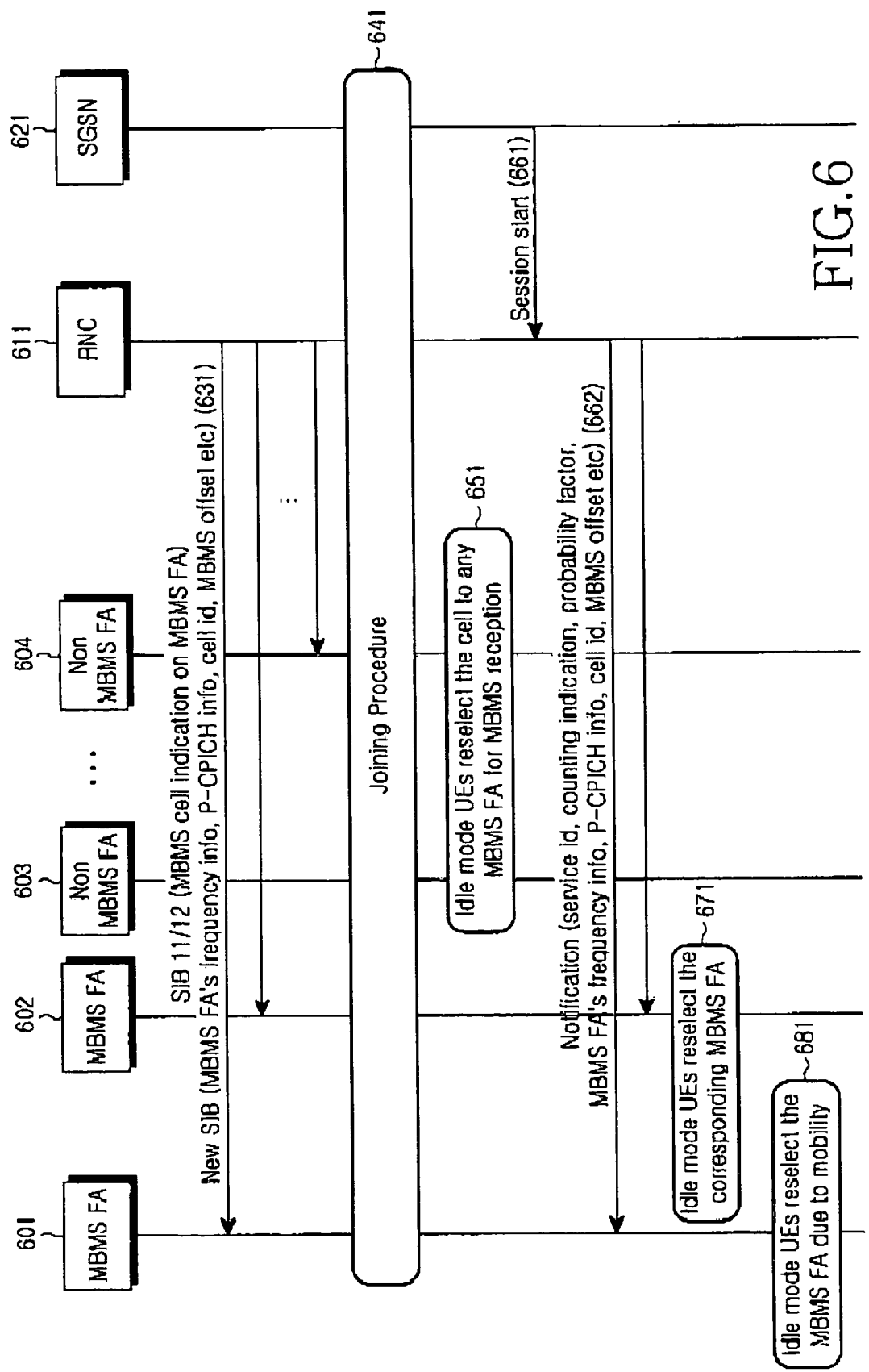
FIG. 6 is a message flow diagram illustrating a procedure for reselecting an MBMS cell according to a second embodiment of the present invention.

FIG. 6 is a message flow diagram illustrating a procedure for reselecting a cell available for an MBMS service in the case where the number of MBMS FAs among FAs overlapping each other in the same area is at least 2. Referring to FIG. 6, reference numerals 601 and 602 represent MBMS FAs, and reference numerals 603 to 604 represent non-MBMS FAs. The reference numerals 601, 602, 603 and 604 represent FAs which overlap each other in the same geographical area and use different frequencies. Each of the FAs can be comprised of one or more cells. It will be assumed herein that each FA has one cell, for the convenience of explanation. In the following description, the FAs represent different cells, and the terms "FA" and cell are used interchangeably. Reference numeral 611 represents an RNC for providing the MBMS service, and reference numeral 621 represents an SGSN. Reference numeral 631 represents a system information block (SIB) transmitted from the RNC 611, and SIB 631 has different information in the FAs 601, 602, 603 and 604. A method for providing information on MBMS FAs to UEs located in the FAs 601, 602, 603 and 604 using the SIB employs the first, second and third methods proposed in FIG. 5.

According to the first method, an SIB transmitted to the MBMS FA 601 includes information on the MBMS FA 602 as information on a neighbor cell, and an SIB transmitted to the MBMS FA 602 includes information on the MBMS FA 601 as information on a neighbor cell. In addition, SIBs transmitted to the non-MBMS FAs 603 and 604 include information on the MBMS FAs 601 and 602 as information on neighbor cells.

As illustrated in conjunction with FIG. 5, information on a neighbor MBMS cell and information indicating whether a UE's cell is available for an MBMS service can be analyzed by checking whether MCCH configuration information is included in another SIB, or checking information indicating whether the UE's cell is available for the MBMS service through a comparison with an SIB 3/4.

According to the second method, when a new MBMS-dedicated SIB for an MBMS service is used, a UE can simultaneously analyze the information on a neighbor cell and the information on its current cell.

According to the third method, a UE determines an MBMS cell by analyzing the MBMS FAs 601 and 602 that transmit an SIB 11/12 including the MBMS_Qoffset_s,n value.

In a Joining procedure of step 641, an MBMS service is requested.

In step 651, a UE in an idle mode in a cell corresponding to the MBMS FA 603 or 604 performs cell reselection to a cell corresponding to an MBMS FA after performing the Joining procedure in step 641. In this case, the UE in an idle mode has information on both cells for the MBMS FAs 601 and 602 covering the same area, acquired in step 631. In the case shown in FIG. 5, because only one FA (or cell) is available for the MBMS service, when a UE moves to an MBMS FA in the same area, the UE can receive a desired MBMS service. However, in the case shown in FIG. 6, because there are two MBMS FAs, the UE cannot determine which MBMS FA provides the desired MBMS service, with only the SIB separately transmitted for each cell in step 631.

Therefore, if the FAs 601 and 602 provide the same MBMS service, the FA 601 or the FA 602 is selected in step 651 according to reception power measurement results of UEs. That is, a cell is reselected according to a preferred frequency of a UE. However, if the FAs 601 and 602 provide different MBMS services, the UE reselects in step 651 an FA according to whether the requested MBMS service is available, instead of reselecting an FA according to a desired particular MBMS service.

In step 661, the SGSN 621 recognizing a start of the MBMS service transmits a Session Start message indicating an impending start of the MBMS service to the RNC 611. In step 662, the RNC 611 receiving the Session Start message transmits an MBMS Notification message to an MBMS FA corresponding to the Session Start message among the FAs 601 and 602. The Notification message is not transmitted to the cells for the non-MBMS FAs 603 and 604. The Notification message includes a corresponding MBMS service ID, a counting indication for informing a UE in an idle mode of the necessity for an RRC connection, a probability factor necessary for the RRC connection operation, and information on an MBMS FA providing the MBMS service. The MBMS FA information includes frequency information of a corresponding FA, cell ID, cell information, and MBMS offset.

For example, in step 662, if an MBMS service corresponding to the Notification message is an MBMS service corresponding to the FA 601 among the MBMS FAs 601 and 602, UEs located in the FA 602, receiving the Notification message, reselect the cell for the FA 601 to receive data for the MBMS service. That is, in step 651, the UEs select an MBMS FA according to availability of the MBMS service, and in step 662, the UEs reselect an MBMS FA according to a desired particular MBMS service.

In step 671, UEs in an idle mode located in the FA 602 reselect a cell for the FA 601 after receiving the Notification message. In this case, the UEs in an idle mode located in the FA 602 must satisfy a reception power measurement result in connection with a cell for the FA 601. That is, the UEs located in the FA 602 reselect a cell for the FA 601 if they can receive an MBMS service provided by the FA 601 as a result of reception power measurement in connection with the cell for the FA 601.

In the case of steps 662 and 671, the UEs select an FA according to a desired particular MBMS service before a session for the MBMS service is started. In the case of step 681, when the MBMS service is in progress, the UEs select an FA according to the desired particular MBMS service. In step 681, the UEs preferentially reselect an MBMS cell among neighbor cells using the system information received in step 631. Cell reselection is achieved through reception power measurement by the UEs, and the UEs analyze MBMS availability information received from the selected cell over the MCCH.

The MBMS availability information is information indicating whether a particular MBMS service the UE desires to receive is available. Therefore, the UE determines whether a particular MBMS service is available in the reselected cell by analyzing the MBMS availability information. If it is determined that the reselected cell is a cell unavailable for the particular MBMS service requested by the UE, the UE moves to another MBMS FA servicing the same area using the system information. That is, the UE reselects a cell for another MBMS FA using the system information.

The MBMS availability information can further include information on an actual MBMS FA available for a particular MBMS service requested by the UE as well as information on whether an MBMS service is available for the cell including the current UE. That is, the MBMS availability information includes information on an actual FA where the MBMS service requested by the UE is in progress.

In other words, the MBMS availability information includes an MBMS service ID for an MBMS service in progress in the reselected cell, frequency information of the cell, cell ID, P-CPICH information, MBMS offset information, etc. Therefore, the UE receiving the MBMS availability information over MCCH determines whether a particular MBMS service is available in its current cell, and performs cell reselection to a cell available for the particular MBMS service if the particular MBMS service is unavailable in its current cell.

Figure 7:
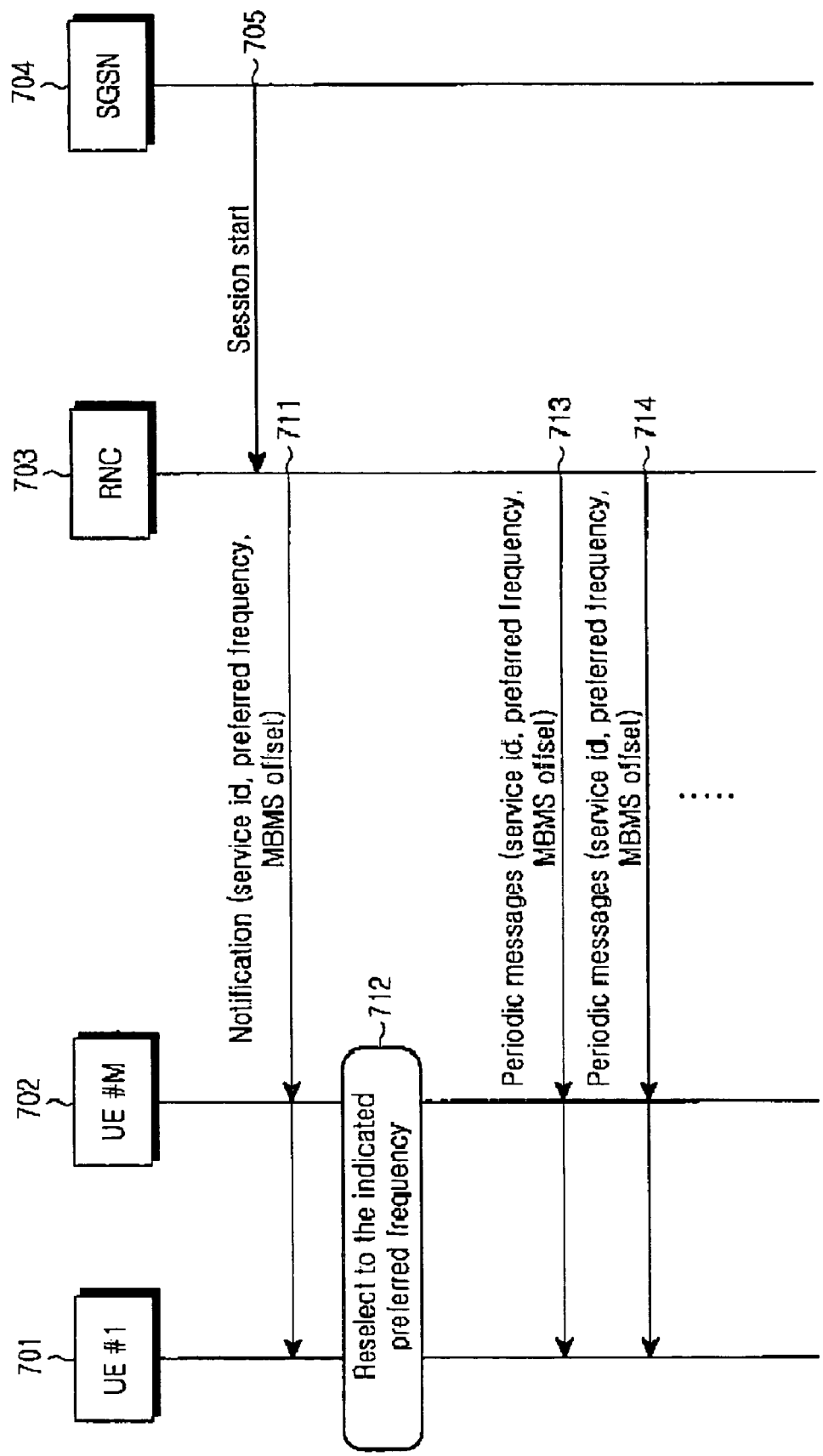
FIG. 7 is a message flow diagram illustrating a procedure for performing cell reselection to a preferred frequency band supporting an MBMS service according to a third embodiment of the present invention.

FIG. 7 is a message flow diagram illustrating a procedure for providing an MBMS service in at least two MBMS FAs in connection with the procedure illustrated in FIG. 6. In this case, an MBMS offset value is used according to an embodiment of the present invention, and the procedure illustrates a method for transmitting a service provided in another FA and information on the corresponding FA through an MCCH Availability message, and a process of transmitting information on a preferred frequency band for each service to the UEs after a session start. It is assumed herein that the at least two FAs provide different MBMS services, e.g., Service 1 and Service 2.

Referring to FIG. 7, reference numerals 701 and 702 represent UEs receiving an MBMS service, and reference numeral 703 represents an RNC for providing the MBMS service. Here, the UEs 701 and 702 are located in a cell corresponding to a frequency band other than a preferred frequency band for the MBMS service.

In step 711, the RNC 703 receiving a Session Start message 705 from the SGSN 704 sends a Notification message 711 including information necessary for movement to a preferred frequency band for the MBMS service to the UEs 701 and 702 before start of a session. In this Notification process, the RNC 703 can use the currently defined Session Start message or another separate message. The RNC 703 includes an MBMS service ID for the MBMS service whose session is to be started, information on a preferred frequency for the MBMS service, and MBMS offset information used for reselection of a cell using another frequency.

In step 712, the UE 701 receiving the Notification message performs inter-frequency measurement using the preferred frequency for the MBMS service in order to reselect a cell to the preferred frequency band in connection with the MBMS service.

In steps 713 and 714, the RNC 703 periodically transmits to the UEs 701 and 702 a message including MBMS service ID, preferred frequency information and MBMS offset information in order to support mobility of the UEs. The message can be transmitted over the MCCH.

The UEs 701 and 702 receiving the MBMS service immediately perform inter-frequency measurement in the following cases:

1) Before start of a session, a UE immediately performs inter-frequency measurement when it determines through a Notification message that a preferred frequency band for a joined MBMS service is not a frequency band for a current cell.

2) During a session, a UE immediately performs inter-frequency measurement when it performs cell reselection and determines through periodically transmitted Control messages that a frequency of the reselected cell is not identical to a preferred frequency band for the corresponding MBMS service.

In other words, a UE requesting the MBMS service performs inter-frequency measurement when it receives the Notification message 711 including information on the preferred frequency for the MBMS service, transmitted before start of the MBMS session.

Alternatively, when an MBMS session for an MBMS service is in progress and a UE receiving the MBMS service reselects a new cell due to movement of the UE, the UE should perform inter-frequency measurement if it determines through periodically transmitted Control messages 713 and 714 that a preferred frequency band for the MBMS service is not identical to a frequency of the selected cell.

When the UE 701 or 702 receives the Notification message transmitted before start of a session or the Control message transmitted during a session and attempts cell reselection to a preferred frequency band for the MBMS service, if cell reselection is performed to another frequency band other than the frequency band supporting the MBMS service due to a poor radio condition of the transmission frequency band, the UE stays in the current cell rather than performing cell reselection to another frequency band. This is because cell reselection to another frequency band other than the preferred frequency band is equal in performance to staying in the current cell, and causes another measurement and cell reselection. The UE staying in the current cell can receive an MBMS service even in the current cell by requesting the MBMS service.

The UE receiving an MBMS service while staying in the current cell must perform inter-frequency measurement even though Sx (representing a value obtained by performing frequency measurement in the current cell for a particular MBMS service X) is larger than Sinter (representing a threshold set for performing inter-frequency measurement) for a period for the inter-frequency measurement. This is because unless Sx is smaller than Sinter, a UE that failed in cell reselection to the preferred frequency band will not perform inter-frequency measurement for cell reselection to the preferred frequency band for the MBMS service, thereby avoiding cell reselection to the preferred frequency.

For example, in a measurement period of a compressed mode or a Forward Access Channel (FACH) measurement occasion period, i.e., an inter-frequency measurement period assigned according to a state and mode of the UE, which is a period for performing the inter-frequency measurement, the UE performs inter-frequency measurement regardless of a value of the Sx.

Even though Sx>Sinter, the UE must periodically perform measurement on a preferred frequency band for cell reselection to the preferred frequency band. The UE periodically performs the measurement based not only on the measurement period but also based on a predetermined timer value or period. The timer value is previously transmitted through system information.

Therefore, the UEs that failed in cell reselection to the preferred frequency band perform periodic inter-frequency measurement while staying in the current cell, and makes cell reselection to the preferred frequency band for the MBMS service if the inter-frequency measurement result satisfies the cell reselection condition.

The UE performing cell reselection to the preferred frequency band for the MBMS service uses an MBMS offset from the RNC 703 in steps 711, 713 and 714. That is, the MBMS offset information included in the messages transmitted in steps 711, 713 and 714 is provided to give priority to the preferred frequency band supporting the MBMS service over other frequency bands. By applying the MBMS offset to the preferred frequency band, a cell reselection probability at the preferred frequency is higher than a cell reselection probability at other frequencies.

As described in connection with Equation (3), Rn values for cells corresponding to a preferred frequency band for a particular MBMS service are larger by the MBMS offset than Rn values for cells corresponding to other frequencies. As a result, there is high probability that the cells corresponding to the preferred frequency band will have higher priority (or rank) than the cells corresponding to other frequencies. Also, there is high probability that a UE desiring to receive the MBMS service will perform cell reselection to the preferred frequency band. If a cell for other frequency bands is reselected although the MBMS offset is applied, the UE stays in the current cell without performing cell reselection.

Figure 8:
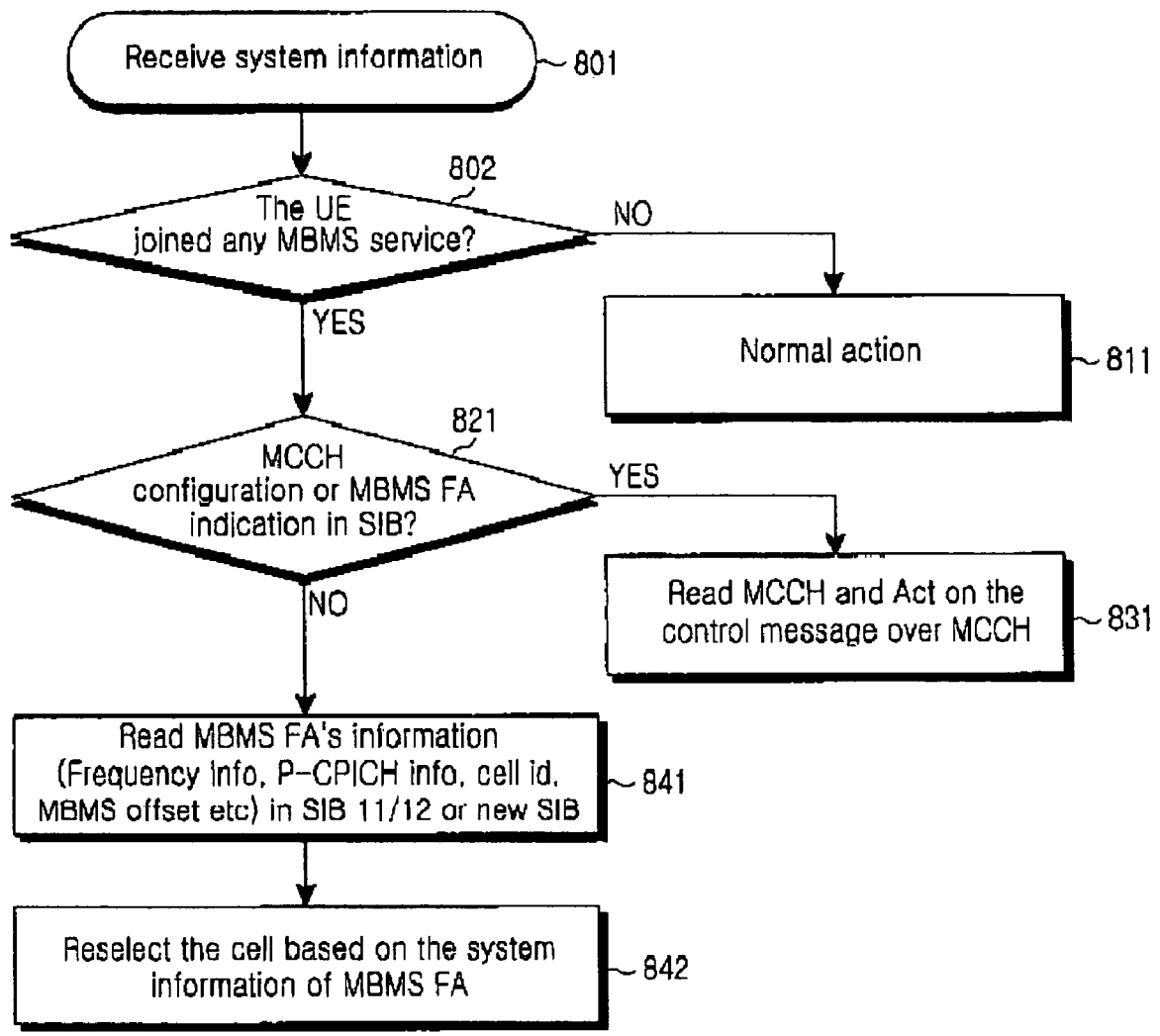
FIG. 8 is a flowchart illustrating an operation of a UE supporting an MBMS service according to the present invention.

FIG. 8 is a flowchart illustrating an operation of a UE based on the first and second methods according to an embodiment of the present invention. Referring to FIG. 8, in step 801, a UE in an idle mode receives system information from a cell where it is currently located. The system information includes information on MBMS FAs overlapping each other in the same geographical area and information on neighbor cells which are not located in the same area but available for the MBMS service.

That is, the UE receives system information including an MBMS enabled cell info field according to the first method, receives a newly defined MBMS-dedicated SIB according to the second method, or receives an SIB including an MBMS_Qoffset_s,n value according to the third method.

In step 802, the UE determines whether a desired particular MBMS service is available in the current cell. The UE proceeds to step 821 if the desired particular MBMS service is available in the current cell. However, if the desired particular MBMS service is unavailable in the current cell, the UE proceeds to step 811 where it performs a normal operation.

In step 821, the UE determines whether MCCH configuration information is included in the system information transmitted from the cell where it is currently located. That is, according to the first method, the UE analyzes an SIB including an MBMS enabled cell indication to determine whether the MBMS service is available in the current cell and whether the MBMS service is available in the neighbor cell. According to the second method, the UE determines whether the MBMS service is available in the current cell based on an MBMS enabled cell info field and a same service area indication field in the MBMS-dedicated SIB. According to the third method, the UE determines whether the MBMS service is available in the current cell based on the MBMS_Qoffset_s, n value.

If it is determined in step 821 that MCCH configuration information for the MBMS service is not included in the system information from the current cell or the current cell is unavailable for the particular MBMS service, the UE proceeds to step 841. However, if it is determined in step 821 that MCCH configuration information is included in the system information from the current cell or the current cell is available for the particular MBMS service, the UE proceeds to step 831.

In step 831, the UE receives the periodically transmitted MCCH and operates according to a control message transmitted over the MCCH. In step 841, the UE receives an SIB 11/12 including information on a neighbor MBMS cell, or receives a newly defined MBMS-dedicated SIB including an MBMS enabled cell info field indicating information on a neighbor cell, and information on its cell. In addition, the UE receives an SIB including an MBMS_Qoffset_s,n value indicating a cell having priority for providing the MBMS service over other cells.

In addition, the UE periodically receives MCCH including information on the MBMS FA taking its mobility into consideration. The MCCH includes MBMS service ID and preferred frequency information.

In step 842, the UE performs cell reselection to an MBMS FA, or MBMS cell, based on the received information on the MBMS FA. The UE analyzes the MBMS enabled cell info field, and preferentially selects a cell belonging to the same Node B as the Node B for its cell, i.e., selects a cell covering the same area as the area covered by its cell. If there is no information on an MBMS cell covering the same area, the UE performs cell reselection to another neighbor cell. If there is an MBMS cell covering the same area but the reception power is lower than a threshold as a result of reception power measurement for receiving the MBMS service, the UE performs cell reselection to another neighbor MBMS cell. That is, the reselection on all cells must satisfy the reception power measurement result. If the UE cannot perform cell reselection to a preferred frequency band supporting the MBMS service, it performs periodic inter-frequency measurement while staying in the current cell thereby to perform cell reselection to the preferred frequency band while satisfying the cell reselection condition.

Figure 9:
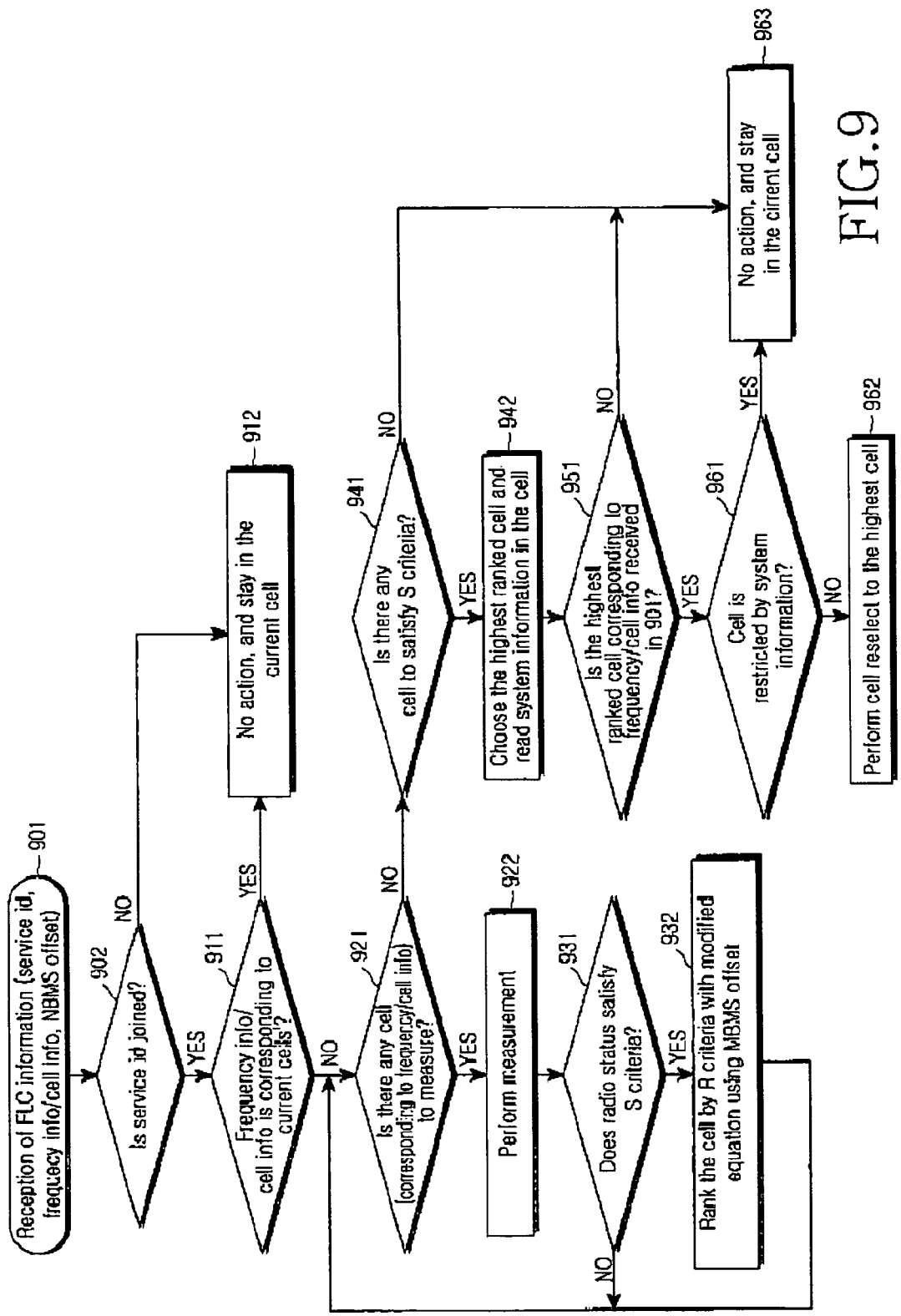
FIG. 9 is a flowchart illustrating another operation of a UE supporting MBMS service according to the present invention.

FIG. 9 is a flowchart illustrating an operation of a UE based on the third method according to an embodiment of the present invention. Referring to FIG. 9, in step 901, a UE receives a Session Start message, or receives information for FLC (Frequency Layer Convergence), i.e., service ID, frequency/cell info and MBMS offset information, through a Notification message or a periodically transmitted message during a session. In step 902, the UE checks a service ID in the information for FLC to determine whether an MBMS service in session in the cell is an MBMS service that the UE joined.

If it is determined in step 902 that the ongoing MBMS service is an MBMS service that the UE joined, the UE checks in step 911 whether the frequency info/cell info is identical to cell information of the current cell. However, if it is determined in step 902 that the ongoing MBMS service is not an MBMS service that the UE joined, or if it is determined in step 911 that the frequency info/cell info is identical to cell information of the current cell, the UE proceeds to step 912. In step 912, the UE says in the current cell without having to perform cell reselection for the MBMS service.

However, if it is determined in step 911 that the frequency info/cell info is not identical to cell information of the current cell, the UE checks in step 921 whether there is any cell to measure for cell reselection. That is, the UE determines in step 921 whether there is any cell on which measurement should be performed according to the frequency info/cell info. If it is determined in step 921 that there is a cell to measure, the UE performs measurement on the corresponding cell in step 922.

In step 931, the UE checks whether the measurement result of step 922 satisfies S criteria. If the measurement result satisfies S criteria, the UE ranks, in step 932, the cell in a priority list for cell reselection by applying a modified R criteria equation that uses an MBMS offset proposed in the present invention. The process then returns to step 921.

However, if it is determined in step 921 that there is no cell on which measurement should be performed according to the frequency info/cell info, the UE checks in step 941 whether there is any cell satisfying S criteria. If there is a cell satisfying S criteria, the UE selects the cell with highest priority (or a highest ranked cell) from the priority list for cell reselection in step 942. In step 951, the UE checks whether the highest ranked cell corresponds to the frequency info/cell info received in step 901.

If the highest ranked cell corresponds to the frequency info/cell info received in step 901, the UE checks in step 961 whether the cell is restricted by system information received in step 942 in staying (or camping) in the current cell. If it is determined in step 961 that the cell is not restricted by the system information, the UE reselects the highest ranked cell in step 962. The system information can be PLMN(Public Land Mobile Network) ID, forbidden LA(Location Area) or cell status. However, if it is determined in step 961 that the cell is restricted by the system information, if it is determined in step 951 that the highest ranked cell does not correspond to the frequency info/cell info, or if it is determined in step 941 that there is no cell satisfying S criteria, the UE stays in the current cell without having to perform cell reselection for the MBMS service.

As can be understood from the foregoing description, the present invention transmits radio resource information for a cell available for a particular packet data service to a UE located in a cell unavailable for the packet data service when the cell available for the packet data service overlaps with the cell unavailable for the packet data service in the same area, thereby efficiently providing the packet data service. In addition, the present invention transmits information on a neighbor cell and information on a serving cell to the UE, hereby facilitating mobility of the UE and efficient cell selection.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for selecting a cell by a user equipment (UE) to receive a Multimedia Broadcast/Multicast Service (MBMS) service in a mobile communication system which supports the MBMS service with different frequency allocations (FAs) in the same area, the method comprising the steps of:

transmitting, by a radio network controller (RNC), information on an MBMS cell to the UE, the MBMS cell information including an MBMS offset for controlling priority for cell reselection to the MBMS cell; and performing, by the UE, cell reselection using the MBMS cell information and receiving the MBMS service from the reselected cell.

2. The method of claim 1, wherein the MBMS cell information further includes frequency information of the MBMS cell.

3. The method of claim 1, wherein the MBMS cell information further includes a cell identifier (ID) for identifying the MBMS cell and a target cell.

4. The method of claim 1, wherein the UE reselects a cell by applying the MBMS offset to an equation predefined for cell reselection.

5. The method of claim 1, wherein the MBMS cell information further includes an MBMS service ID of an MBMS service available in the MBMS cell.

6. The method of claim 1, wherein the RNC transmits the MBMS cell information through a system information block (SIB) separately transmitted for each cell.

7. The method of claim 1, wherein the RNC separately transmits the MBMS cell information through an MBMS-dedicated SIB, for each cell.

8. The method of claim 7, wherein the MBMS-dedicated SIB further includes information indicating whether a serving cell where the UE is located is available for the MBMS service.

9. The method of claim 1, wherein the UE performs cell reselection to a neighbor cell with highest priority using the MBMS offset.

10. A method for reselecting a cell for a Multimedia Broadcast/Multicast Service (MBMS) service in a mobile communication system which supports the MBMS service with different frequency allocations (FAs) in the same area, the method comprising the steps of:
transmitting, by a radio network controller (RNC), a system information block (SIB) to a user equipment (UE), the SIB including identification information indicating whether a neighbor cell is available for the MBMS service; and
performing, by the UE, cell reselection to an MBMS cell using the SIB.

11. The method of claim 10, wherein the identification information includes a cell identifier (ID) of the MBMS cell, frequency information indicating an FA of the MBMS cell, cell information indicating a primary scrambling code for a primary common pilot channel (P-CPICH) of the MBMS cell, and an offset for guaranteeing priority for cell reselection.

12. The method of claim 10, wherein the identification information is separately transmitted to each cell over a broadcasting control channel (BCCH).

13. The method of claim 10, wherein the UE performs cell reselection to the MBMS cell after joining the MBMS service.

14. A method for reselecting a cell for a Multimedia Broadcast/Multicast Service (MBMS) service in a mobile communication system which supports the MBMS service with different frequency allocations (FAs) in the same area, the method comprising the steps of:
periodically transmitting, by a radio network controller (RNC), identification information indicating whether a neighbor cell is available for an MBMS service, to a user equipment (UE) through a control message; and
performing, by the UE, cell reselection to an MBMS cell using the identification information received through the control message.

15. The method of claim 14, wherein the identification information includes a cell identifier (ID) of the MBMS cell, frequency information indicating an FA of the MBMS cell, cell information indicating a primary scrambling code for a primary common pilot channel (P-CPICH) of the MBMS cell, and an offset for controlling priority for cell reselection.

16. The method of claim 14, wherein the identification information is separately transmitted for each MBMS service over an MBMS control channel (MCCH).

17. A method for performing cell reselection to a preferred frequency band by a user equipment (UE) in a mobile communication system which supports a Multimedia Broadcast/Multicast Service (MBMS) service with different frequency allocations (FAs) in the same area, the method comprising the steps of:
receiving, from a radio network controller, a message including an MBMS service identifier (ID), information on a preferred frequency for the MBMS service, and an MBMS offset for controlling cell reselection;
performing inter-frequency measurement using the information included in the message;
and performing cell reselection if a preferred frequency band for an MBMS cell is higher in reception power than a frequency band for a current cell.

18. The method of claim 17, wherein the UE receives a notification message including information transmitted before a start of an MBMS session, performs inter-frequency measurement based on the notification message, and performs cell reselection to the preferred frequency band if the preferred frequency band for an MBMS cell is higher in reception power than the frequency band for the current cell.

19. The method of claim 17, wherein the UE periodically receives a control message including information after a start of an MBMS session, performs inter-frequency measurement based on the control message, and performs cell reselection to the preferred frequency band if the preferred frequency band for an MBMS cell is higher in reception power than the frequency band of the current cell.

20. The method of claim 17, wherein when an MBMS session for the MBMS service is in progress and the UE has selected a new cell, the UE receives a periodically transmitted notification message and performs inter-frequency measurement based on the notification message.

21. The method of claim 20, wherein the UE performs cell reselection if it is determined from the notification message that a frequency band of the reselected cell corresponds to a preferred frequency band.

22. The method of claim 20, wherein the UE stays in the current cell and receives the MBMS service from the current cell, if it is determined from the notification message that a frequency band of the reselected cell does not correspond to a preferred frequency band.

23. A method for providing by a radio network controller (RNC) a Multimedia Broadcast/Multicast Service (MBMS) service to a user equipment (UE) located in a non-MBMS frequency allocation (FA) in a mobile communication system which supports the MBMS service with different FAs in the same geographical area, the method comprising the steps of:
transmitting, by the RNC, a system information block (SIB) including information on an MBMS FA to the UE; and
periodically transmitting a message including information on the MBMS FA to the UE.

24. The method of claim 23, wherein the information on the MBMS FA includes an MBMS service identifier (ID) for the MBMS service, frequency information of the MBMS FA, a cell ID of the FA, and an MBMS offset for controlling cell reselection.

25. A method for receiving a Multimedia Broadcast/Multicast Service (MBMS) service by a user equipment (UE) located in a non-MBMS frequency allocation (FA) in a mobile communication system which supports the MBMS service with different FAs in the same geographical, the method comprising the steps of:
receiving, from a radio network controller (RNC), a system information block (SIB) including information on an MBMS FA;
analyzing the information on the MBMS FA in the SIB; and performing cell reselection to the MBMS FA based on the analysis result.

26. The method of claim 25, wherein the SIB further includes information on whether an FA where the UE is located is available for the MBMS service.

27. A method for receiving a Multimedia Broadcast/Multicast Service (MBMS) service by a user equipment (UE) located in a non-MBMS frequency allocation (FA) in a mobile communication system which includes at least one non-MBMS cell and supports the MBMS service with different FAs in the same area, the method comprising the steps of:
- receiving, by the UE, information on an MBMS cell from a radio network controller (RNC);
- requesting, by the UE, a particular MBMS service; analyzing the received information; and
- reselecting a cell available for the particular MBMS service based on the analyzed information.

28. The method of claim 27, wherein the received information includes system information for a particular cell unavailable for the particular MBMS service, and information on a neighbor cell available for the MBMS service.

29. The method of claim 27, wherein the received information includes information indicating whether a cell where the UE is located is available for the MBMS service, frequency information used in a neighbor cell available for the MBMS service, a cell identifier (ID), cell information, and an offset.

30. The method of claim 27, wherein the received information is separately transmitted for each cell through a system information block (SIB).

31. The method of claim 27, wherein the received information is separately transmitted for each MBMS service through a control message periodically transmitted in association with the MBMS service.

32. The method of claim 27, wherein the received information includes both information indicating whether a cell where the UE is located is available for a particular MBMS service and information indicating whether a neighbor cell available for the MBMS service is available for the particular MBMS.

33. The method of claim 28, wherein the UE measures reception power of neighbor cells and selects a neighbor cell available for the requested MBMS service based on the analysis result if there is at least one neighbor cell available for the particular MBMS service.

34. A method for providing a Multimedia Broadcast/Multicast Service (MBMS) service to a user equipment (UE) located in a cell unavailable for the MBMS service by a radio network controller (RNC) including at least one cell unavailable for the MBMS service and other cells providing the MBMS service with different frequencies in the same area in a mobile communication system providing the MBMS service, the method comprising the steps of:
- transmitting, by the RNC, a system information block (SIB) for the MBMS service to the UE;
- reselecting, by the UE, a cell available for a particular MBMS service upon receiving a request for the particular MBMS service; and
- assigning radio resources for providing the particular MBMS service to the UE.

35. The method of claim 34, wherein the SIB includes system information for the cell unavailable for the particular MBMS service and information on a neighbor cell available for the MBMS service.

36. The method of claim 35, wherein information on the neighbor cell includes frequency information used in the neighbor cell, a cell identifier (ID), cell information, and an offset.

37. The method of claim 35, wherein the cell information includes information indicating whether the neighbor cell available for the MBMS service is available for the particular MBMS service.

38. The method of claim 35, wherein the cell information further includes information indicating whether a cell where the UE is located is available for the particular MBMS service.

39. The method of claim 37, wherein the information indicating whether the neighbor cell available for the MBMS service is transmitted through an MBMS enabled cell information field.

40. The method of claim 37, wherein the information indicating whether the neighbor cell available for the MBMS service is transmitted through an MBMS offset field.

* * * * *